United States Patent
Lu et al.

(10) Patent No.: US 7,949,345 B2
(45) Date of Patent: May 24, 2011

(54) COGNITIVE RADIO SYSTEM AND METHOD

(75) Inventors: Chih-Yung Lu, Hsinchu (TW);
Chien-Hsiang Chang, Hsinchu (TW)

(73) Assignee: Alfaplus Semiconductor Inc., Hsinchu (TW)

( * ) Notice: Subject to any disclaimer, the term of this patent is extended or adjusted under 35 U.S.C. 154(b) by 123 days.

(21) Appl. No.: 11/902,080

(22) Filed: Sep. 18, 2007

(65) Prior Publication Data
US 2010/0232365 A1    Sep. 16, 2010

(51) Int. Cl.
*H04W 72/00* (2009.01)
(52) U.S. Cl. ........................................ 455/454
(58) Field of Classification Search ............... 702/1, 57, 702/66, 75, 76
See application file for complete search history.

(56) References Cited

U.S. PATENT DOCUMENTS

| | | | |
|---|---|---|---|
| 7,801,490 B1 * | 9/2010 | Scherzer | 455/67.13 |
| 2009/0252095 A1 * | 10/2009 | Lu et al. | 370/329 |
| 2010/0195572 A1 * | 8/2010 | Sadek et al. | 370/328 |

* cited by examiner

*Primary Examiner* — Chi H Pham
*Assistant Examiner* — Fan Ng
(74) *Attorney, Agent, or Firm* — Muncy, Geissler, Olds & Lowe, PLLC (57) ABSTRACT

A cognitive radio system and method for clear and idle channel survey in Wireless Local Area Network (WLAN) are disclosed. Through computing average value of Received-Signal-Strength-Indicator (RSSI_AVG) in each channel, clear channels without interference from other RF devices can be distinguished in the present system and method. Based on an actual WLAN setup, a further AP has a larger possibility to be an idle and clear AP. In the present system and method, searching available channels from furthest AP to nearest AP therefore helps to reduce time of channel survey through repeated rises of signal strength threshold.

21 Claims, 6 Drawing Sheets

COGNITIVE RADIO SYSTEM AND METHOD

BACKGROUND OF THE INVENTION

1. Field of the Invention

This invention relates to a cognitive radio system and method for wireless communication, and more particularly for searching clear and idle channels in Wireless Local Area Network (WLAN) by comparing an average value of Received Signal Strength Indicator (RSSI) in duration of RSSI event, which is distinguished from duration of WLAN event, wherein the WLAN channels include channels in 2.4 GHz Industrial, Scientific and Medical band (ISM band) and Unlicensed National Information Infrastructure band (UNII band).

2. Description of the Prior Art

WLAN is a network for wireless communication between any access point and its surrounding local area network and popularly used in office, home and public region. It follows the IEEE802.11 standard, and her extended versions IEEE802.11a, IEEE802.11b, IEEE802.11g, and etc. for different needs. WLAN communication keeps growing not only in developed connection between laptop PC and desktop PC, but also in developing connections of wireless stick and game controller, wireless home electronics (e.g. home audio and theater, and printer), and mobile phone. With more and more WLAN applications and other radio frequency (RF) devices, RF environment in WLAN region becomes more and more crowded.

The present working frequency bands for IEEE802.11 WLAN are 2.4 GHz (802.11b and 802.11g) which is public Industrial, Scientific and Medical band, ISM band and 5 GHz (802.11a). However, the other wireless communications such as Bluetooth and HomeRF also work on the same frequency band (ISM band) with WLAN and decrease rate of WLAN communication. Besides, some RF devices surrounding in home or working space such as microwave oven, wireless phone or some standby industrial devices can cause non-negligible interference to WLAN communication.

Increasing WLAN applications, Bluetooth and HomeRF communications, and the other RF devices make a crowded WLAN band. In the crowded band, WLAN communication between different access points (APs) becomes not only intermittent but also unrecognizable. In fact, it becomes harder and harder for a traditional WLAN device, which just passes WLAN packet during breaks of a busy band, to deal with the more crowded communication band. In a crowded RF environment (e.g. multi-AP consisting of computers and printers, wireless phone and microwave oven), breaks for WLAN packet transmission become fewer. Traditional WLAN device with single transmission way can not keep a usual transmission bandwidth and event can not work normally.

SUMMARY OF THE INVENTION

Because the traditional WLAN device selects available channels only depending on WLAN packet sequence and signal strength, it can not be used to keep a good communication quality in complex RF environment. The present invention provides a cognitive radio (CR) system and method, which separates channel signal into two durations for WLAN event and RSSI event and computes an average value of RSSI (RSSI_AVG) during RSSI event duration, to distinguish clear channel for passing packet selection from interfered RF channels. Because the RSSI_AVG is RF strength average during no WLAN packet passing, it can be an indicator for fact of interference by other RF devices. By comparing value of RSSI_AVG in each channel, clear channels without interference of other RF devices can be selected.

In order to reach the above-mentioned objects, a CR system according to the present invention comprises a WLAN-event sensor 124 and a RSSI-event sensor 123 to separate signal into two durations for WLAN event and RSSI event. An average of RSSI (RSSI_AVG) resulted from an average computer 130 represents RF signal strength during RSSI event happening. A number of WLAN packet (WLAN_CNT) resulted from a WLAN-event counter 140 represents how busy the current channel is. RSSI_AVG and WLAN_CNT are important values to decide the current channel is a really clear channel for packet passing without interference of other RF devices.

Additionally, a RF strength threshold used in one of issues for WLAN event decision in the WLAN-event sensor 124 can be rose repeatedly through a threshold adjusted 142 for farthest to nearest APs searching. Available-channel selection is accomplished by a first available-channel selector 151, a second available-channel selector 152, and a third available-channel selector 153. With the threshold adjuster 142, available channels can be selected in a shorter period for farthest to nearest APs searching sequence.

For reaching the objects, a CR method according to the present invention comprises steps of: channel signal grabbing for a waiting period from surrounding RF band, getting AP's distance, separating two durations for WLAN event and RSSI event happenings, computing average of RSSI (RSSI_AVG) during RSSI event happening, counting WLAN packet number (WLAN_CNT) during WLAN event happening, and selecting channel with small RSSI_AVG and zero WLAN_CNT to a available channel list from farthest to nearest APs. A RF strength average represented by the RSSI_AVG during no WLAN packet passing really helps to distinguish clear channels from interfered channel by other RF devices in the present invention. At the same time, the searching sequence from farthest to nearest APs also help to reduce searching time.

For a more complete understanding of the features and advantages of the present invention, reference is now made to the following description taken in conjunction with accompanying drawings, in which

DETAILED DESCRIPTION OF THE PREFERRED EMBODIMENTS

As a first embodiment of the CR system provided by the present invention (shown on FIG. 1A), an advanced clear channel assessment (ACCA) device 120 comprises a clear channel assessment (CCA) element 121 and a WLAN packet receiving element 122. The ACCA device 120 and a WLAN-event sensor 124 and a RSSI-event sensor 123 in second embodiment of the CR system (shown on FIG. 1D) can distinguish two separated durations for WLAN event and RSSI event from inputting signal. Additionally, a threshold aduster 142 can change RF strength threshold of the CCA element 121 to search APs with different distance away. With rising the value of RF strength threshold of the CCA element step by step, the CR system can examine channel signal emitted from farthest APs to nearest APs. Based on an actual WLAN setup, a further AP has a larger possibility to be an idle and clear AP. In the present invention, searching available channels from furthest AP to nearest AP therefore helps to reduce time of channel survey through repeated rises of signal strength threshold.

The following descriptions are just for some exemplary embodiments, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

For doing correct decision of WLAN event and RSSI event, all channel signals 110 grabbed from surrounding RF band have a period of 1000 ms.

Figure 1A:
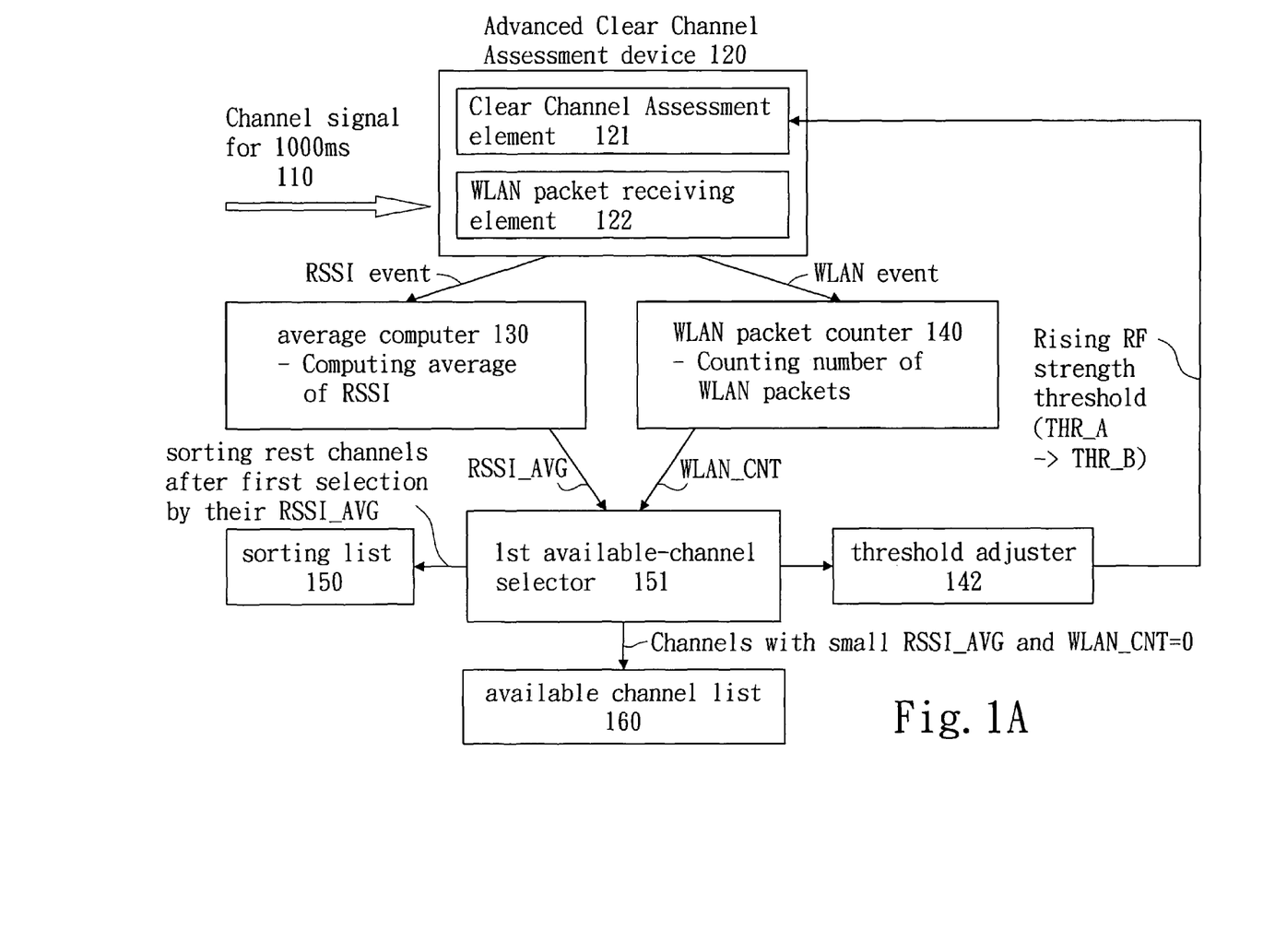
FIGS. 1A to 1C show a scheme for first embodiment of a CR system according to the present invention.
Figures 2A, 2B:
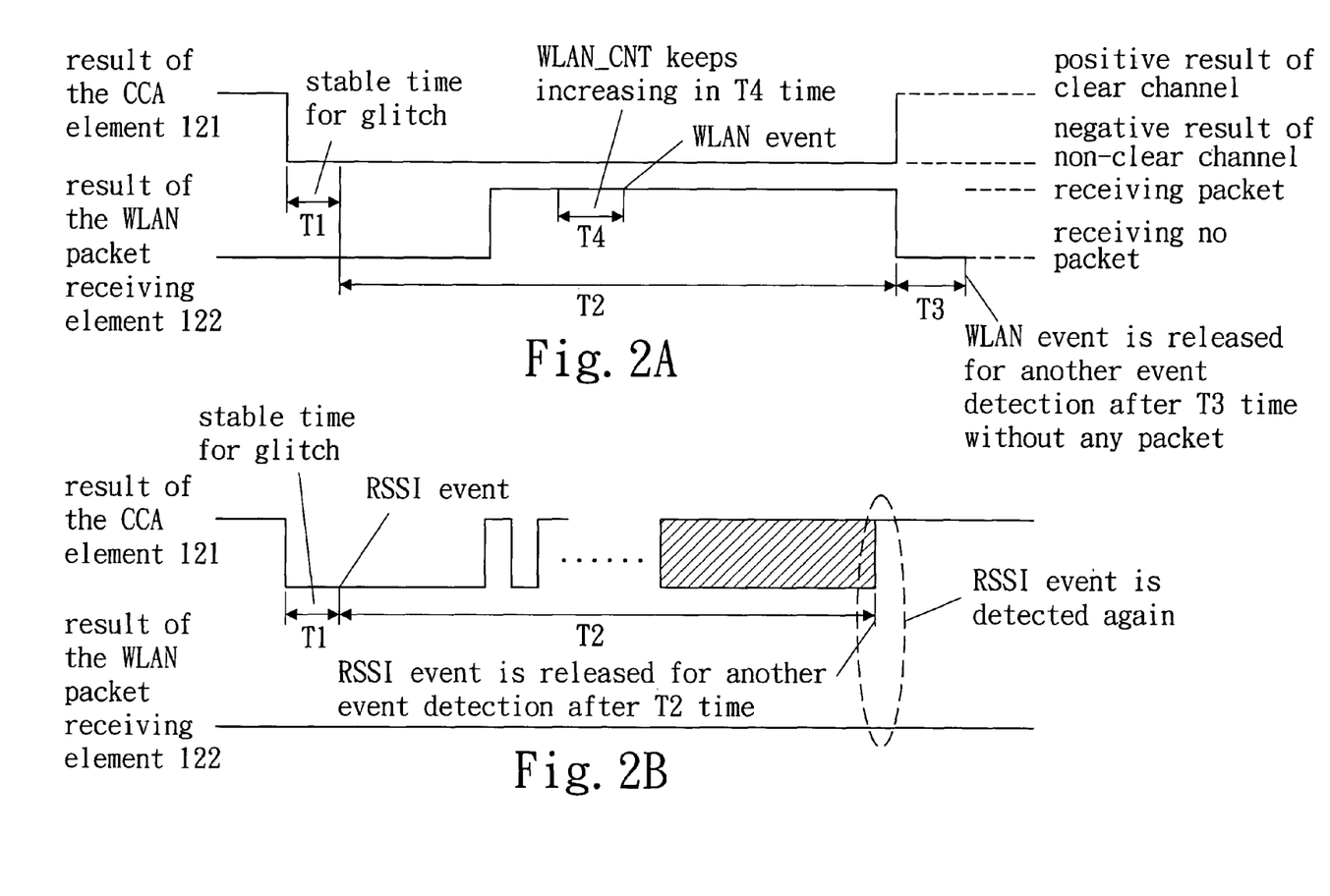
FIG. 2A shows how the first embodiment of a CR system according to the present invention distinguishes WLAN event in an exemplary signal from results of the CCA element and WLAN packet receiving element.
FIG. 2B shows how the first embodiment of a CR system according to the present invention distinguishes RSSI event in an exemplary signal from results of the CCA element and WLAN packet receiving element.

As shown on FIG. 1A, the 1000 ms channel signal is analyzed by the ACCA device 120 and is distinguished into two durations or WLAN event and RSSI event happening. FIGS. 2A and 2B show how the ACCA device distinguishes WLAN event and RSSI event in an exemplary signal from results of the CCA element 121 and WLAN packet receiving element 122. A negative result of non-clear channel is output when the CCA element 121 senses large enough RF strength or large preamble signal strength of received WLAN packet. Otherwise, a positive result of clear channel is output.

To ensure result of the CCA element being correct and without interference of other devices glitch, a waiting period T1 after high signal strength is needed for stability. Besides, a time interval between two RSSI events has to be larger than T2 to ensure enough time for WLAN event sensing between them. As FIG. 2A, a WLAN event happens between two RSSI events and it would not be sensed if T2 was not long enough. Similarly, a time interval between two WLAN events has to be larger than T3 and without any WLAN packet. The WLAN packet receiving element sends positive result not only as a WLAN packet sensed but also as continue WLAN packets sensed for T4 period. As shown on FIGS. 2A and 2B, the RSSI event is happened as negative result of the CCA element (non-clear channel result) and negative result of the WLAN packet receiving element (no packet receiving); the WLAN event is happened as negative result of the CCA element (non-clear channel result) and positive result of the WLAN packet receiving element (packet receiving).

Signal during WLAN event happening is sent to a WLAN packet counter 140 for counting WLAN packet number WLAN_CNT. Similarly, signal during RSSI event happening is sent to a average computer 130 to compute an average value of RSSI (RSSI_AVG).

Figure 1B:
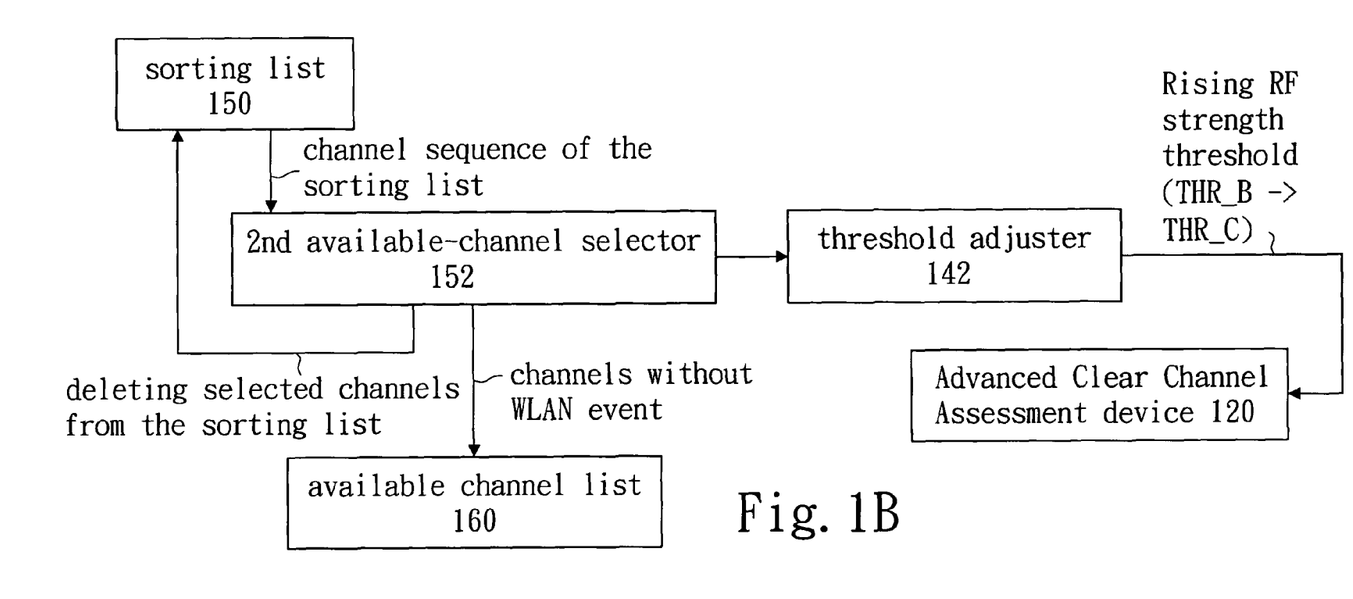
Figure 1C:
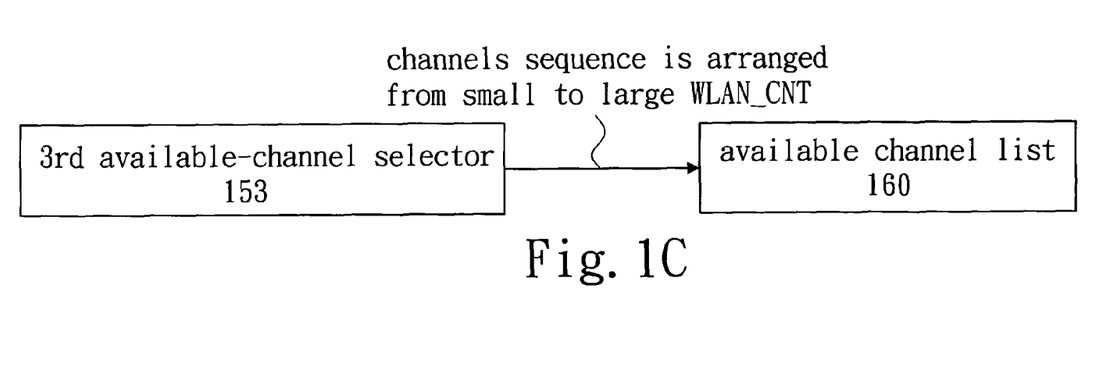
Figure 1D:
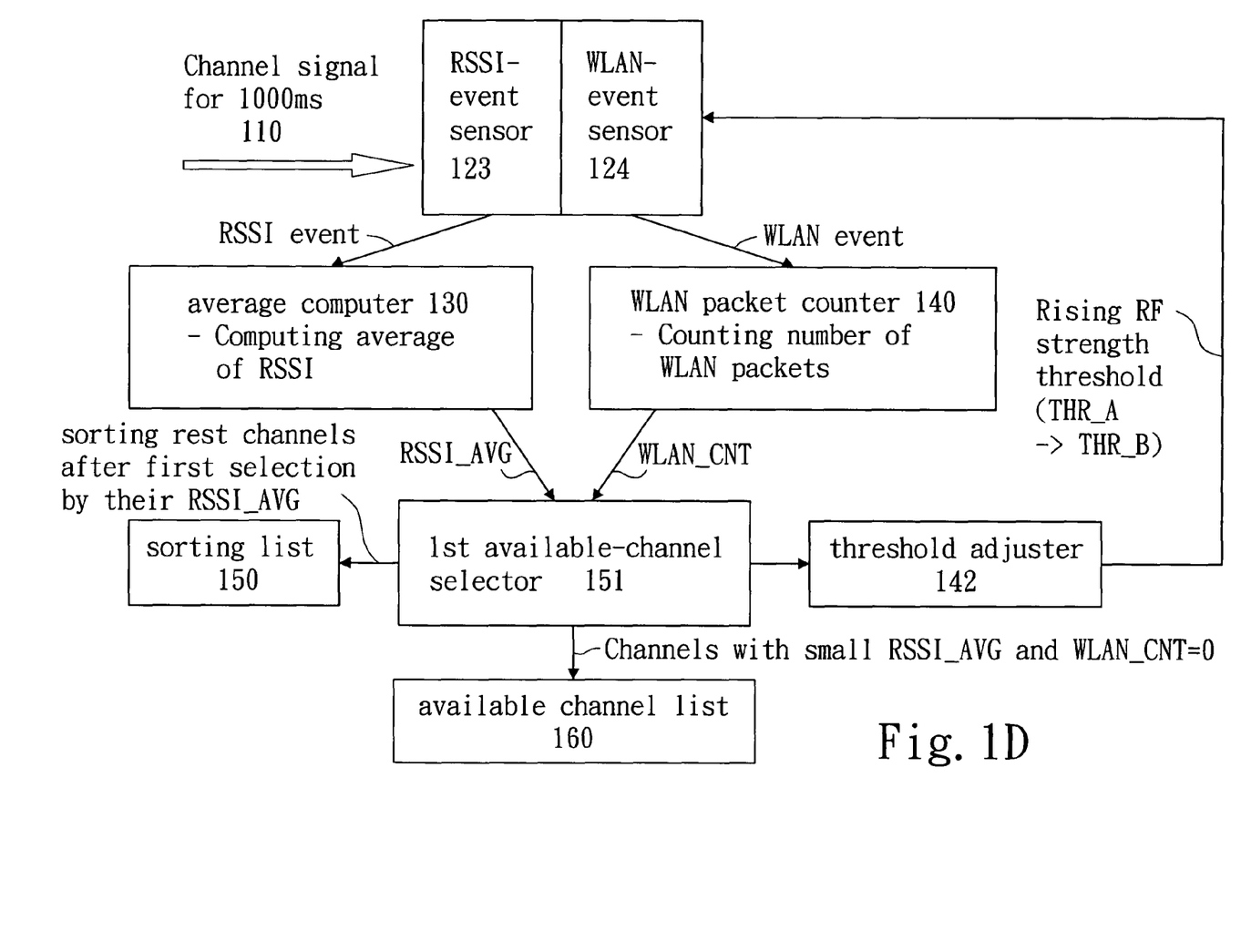
FIG. 1D shows a scheme for second embodiment of a CR system according to the present invention.

Available channel selection is done in the first, second and third available-channel selectors as FIG. 1A. The first available-channel selector selects channels, whose RSSI_AVG is equal to or smaller than a minimum value MIN_RSSI_VAL and WLAN_CNT is equal to zero, to an available channel list 160. Setting the minimum value in the first available-channel selector is to select the less interference channel by other RF device. When RF energy emitted from AP is all the same, different RSSI value may be sensed for APs with different distance away. Because WLAN event happens during packet receiving and packet preamble strength larger than a RF strength threshold THR_A, selecting WLAN_CNT=0 in the first available-channel selector equals to select AP (310) with a distance away (radius A corresponding to the setting RF strength threshold THR_A). When all channels are examined by the first available-channel selector, the rest channels are sorted in a sorting list 150 from small to large RSSI_AVG. The threshold aduster 142 adjusts RF strength threshold in the ACCA device then excuses the ACCA device again for new WLAN event detection. Next, as shown on FIG. 1B, the second available-channel selector 152 follows channel sequence of the sorting list 150 and selects channels without any WLAN event to the available channel list 160. The selected channels by the second available-channel selector 152 are deleted from the sorting list 150. Because the RF strength threshold is rose to THR_B and APs with channel in the sorting list are all inside of radius A after the first available-channel selector, AP 320 with channel selected by the second available-channel selector is in a region which is larger radius B (corresponding to THR_B) and smaller radius A. Similarly, rising the RF strength threshold to THR_C and excusing the second available-channel selector again can select AP 330 within radius C (corresponding to THR_C) and radius B. Gradually adjusting the RF strength threshold and repeatedly excusing the second available-channel selector, and excusing the third available-channel selector can help finding out channels by distance. When the rest channels in the sorting list are inside a small region, the third available-channel selector 153 can sort the rest channels 340, 341, and 342 in the sorting list by their WLAN_CNT from small to large value to sort idler channels to the available channel list.

In the present invention, AP is selected from further distance to nearer distance because the RF strength threshold is gradually adjusted from smaller to larger value. Actually, searching sequence from far to near distance meets the usual situation for WLAN usage. In general WLAN system, user often uses her nearby APs (e.g. network printer, wireless ear phone, wireless phone). Therefore, the farthest AP 310 has the more possibility than the nearest AP 340. APs with different distance away can be distinguished by detecting their RSSI value. The further AP has the lower RSSI value than the near AP. In the present invention, masterly use of gradually adjusting the RF strength threshold and repeatedly excusing the second available-channel selector leads the CR system to find an available channel in a reduced searching time and to provide a good wireless communication.

Figure 3A:
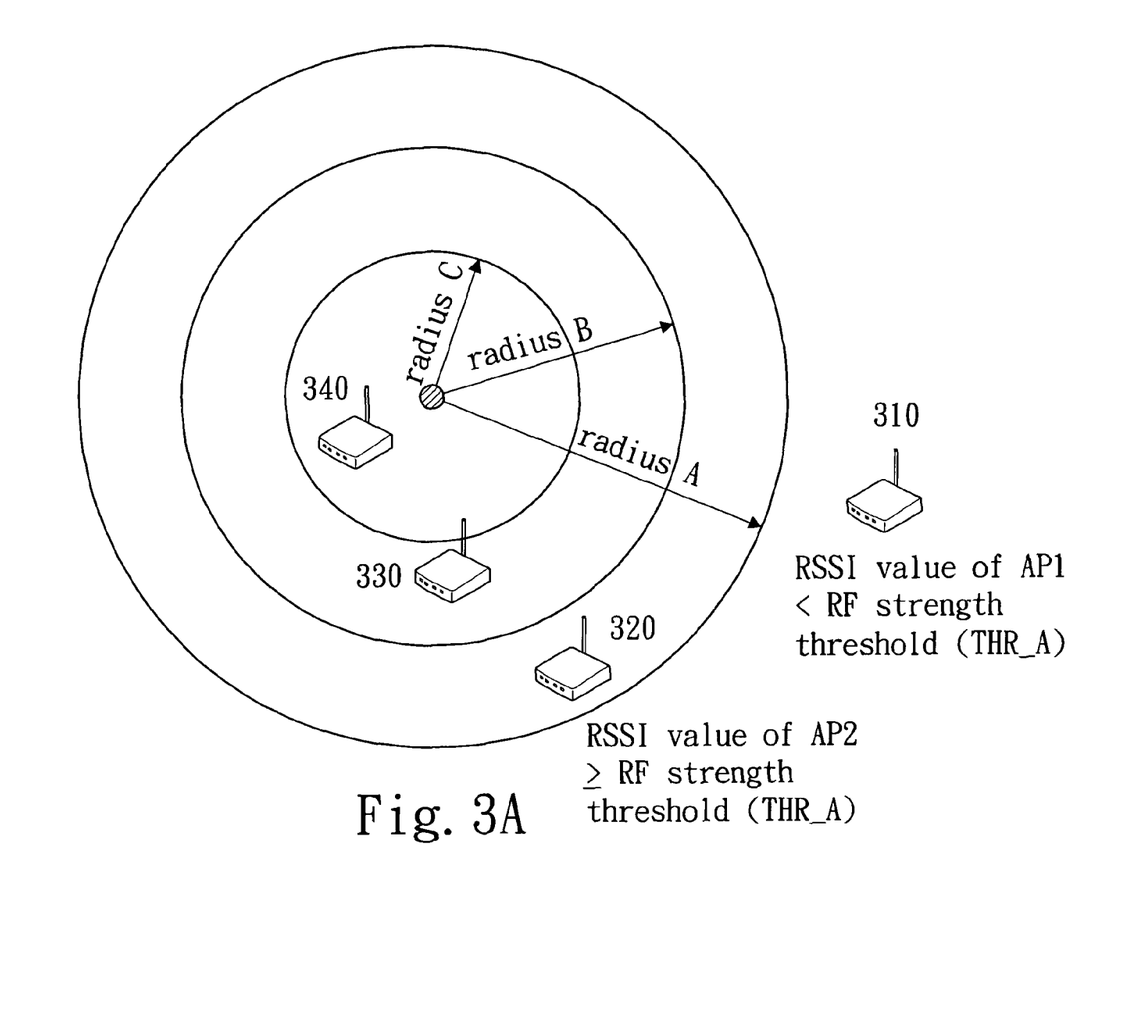
FIG. 3A shows an exemplary distribution of all APs in four parts separated by three radiuses.
Figure 3B:
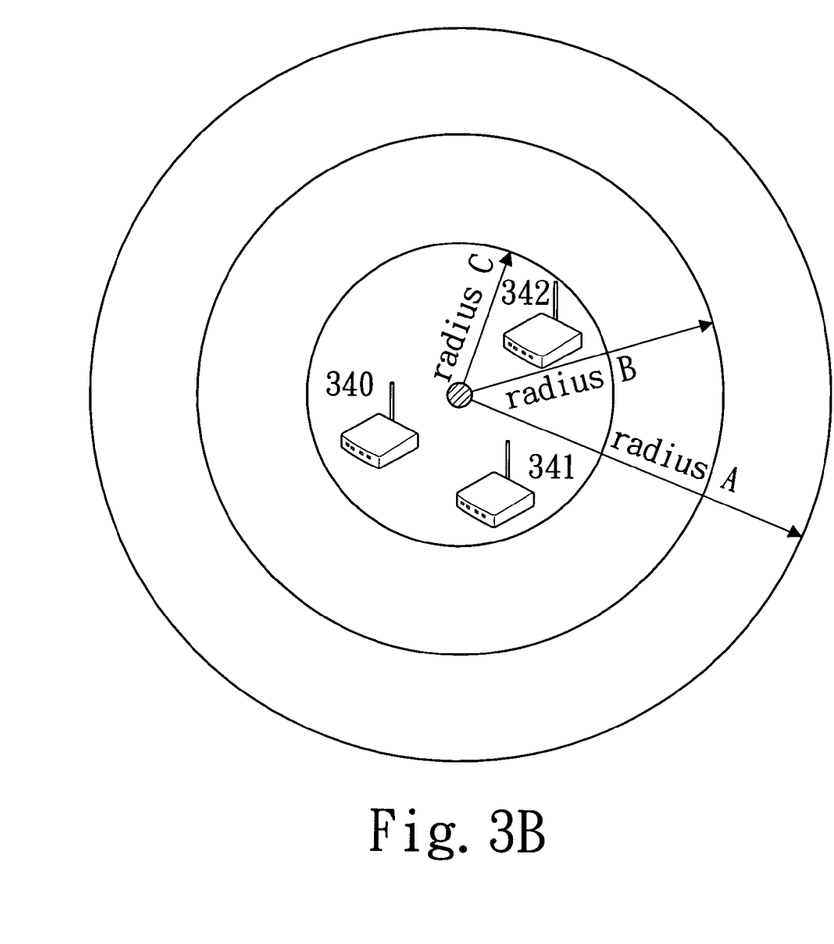
FIG. 3B shows an exemplary distribution of all APs inner the nearest region.

In FIG. 3A, an exemplary AP distribution is shown and radius A, radius B, and radius C are corresponding to the RF strength threshold THR_A, THR_B, and THR_C. When the RF strength threshold is set as THR_A, an AP 310 which is outside radius A is distinguished as clear channel by CCA element but an AP 320 which is inside radius A is distinguished as non-clear channel by CCA. Thus, selecting channel with WLAN_CNT=0 through the first available-channel selector is also to select channels which are outside radius A. Next, to rise the RF strength threshold to THR_B can select out AP 320 between radius A and radius B because THR_B>THR_A and radius B<radius A. Similarly, to rise the RF strength threshold from THR_B to THR_C can select out AP 330 between radius B and radius C because THR_C>THR_A and radius B<radius A. APs 340, 341 and 342 which are inside of radius C are selected into available channel list from small WLAN_CNT to large WLAN_CNT. Thus, the furthest AP 310 can be selected first to reduce searching time.

In first embodiment of the CR method provided by the present invention, first step is to detect two durations, which are WLAN event and RSSI event, in current channel. When WLAN packets are detected and their preamble signal strength is larger and equal a RF strength threshold, the current period is as a WLAN event. When no WLAN packet is detected and signal strength is less than a RF strength threshold, the current period is as a RSSI event. Next, computing an average value of RSSI during RSSI event happening and counting a number of WLAN packets during WLAN event happening are done for information of available channel selection. Selecting low RSSI_AVG channels is to select clear channels with low interference of other RF devices and selecting WLAN_CNT=0 channels is to select idle channels (and outside of radius A) into an available channel list. After all channels are selected, the rest channels out of the available channel list are sorted by their RSSI_AVG and stored in a sorting list in a sequence from low RSSI_AVG to high RSSI_AVG. The sorting step can help the CR method to find available channels efficiently and quickly.

Subsequently, adjusting the RF strength threshold from THR_A to a higher value THR_B and detecting again WLAN event of channels in the sorting list select APs between radius A and radius B (corresponding to THR_A and THR_B). Because APs in the sorting list are all inside of radius A, choosing channels in the sorting list without WLAN event equals to select APs outside of radius B and inside of radius A. Channels selected have to be deleted from the sorting list. Similarly, rising the RF strength threshold to a higher value THR_C and detecting again WLAN event of channels in the sorting list select APs between radius B and radius C (corresponding to THR_B and THR_C). Sequentially, APs outside of radius A are selected first, APs between radius A and radius B and APs between radius B and radius C are following, and APs inside of radius C are sorted from small WLAN_CNT to large WLAN_CNT for choosing idler channels in the available channel list.

Additionally, as the sorting list is established first, deleting channel(s) with too large RSSI_AVG can remove channel(s) with serious interference. When difference between the maximum RSSI_AVG and minimum RSSI_AVG is larger than DISABLE_RSSI_VAL, channel(s) with the maximum RSSI_AVG is removed from the sorting list.

To prevent that there is WLAN event missed for too short time interval between two RSSI events, an interval between two RSSI events has to be larger than exemplary 300 μs. The large enough interval can ensure WLAN event in multi RSSI events to be measured.

Accordingly, as disclosed by the above description and accompanying drawings, the present invention surely can accomplish its objectives, and may be put into industrial use especially for mass product.

It should be understood that various modifications, variations, and appliance could be made from the teaching disclosed above by the person familiar in the art, without departing the spirit of the present invention.

What is claimed is:

1. A Cognitive Radio (CR) system for distinguishing channels without interference from other RF devices in Wireless Local Area Network (WLAN) comprises:
    (a) a WLAN-event sensor for detection WLAN event happening in current channel signal;
    (b) a Receiving-Signal-Strength-Indicator-event sensor (RSSI-event sensor) for detecting RSSI-event happening in current channel signal;
    (c) an average computer for computing an average value of RSSI (RSSI_AVG) in current channel during RSSI-event happening;
    (d) a WLAN packet counter for counting a number of WLAN packets (WLAN_CNT) in current channel during WLAN-event happening;
    (e) a first available-channel for selecting one and plurality of channels with small RSSI_AVG and WLAN_CNT=0 to an available channel list and sorting the one and plurality of rest channels out of the available channel list from low RSSI_AVG to high RSSI_AVG to a sorting list;
    (f) a second available-channel selector for selecting one and plurality of channels without any WLAN event from sequence of the sorting list to the available channel list and deleting the one and plurality of selected channels from the sorting list; and
    (g) a third available-channel selector for sorting one and plurality of channels in the sorting list by their WLAN_CNT and storing them to the available channel list from small to large WLAN_CNT, wherein the WLAN channels include channels in 2.4 GHz Industrial, Scientific and Medical band (ISM band) and Unlicensed National Information Infrastructure band (UNII band).

2. A CR system according to claim 1, wherein the WLAN event is happened when WLAN packets are detected and their preamble signal strength is equal to or larger than a RF strength threshold.

3. A CR system according to claim 1, wherein the RSSI event is happened when no WLAN packet is detected and signal strength of current channel is equal to or larger than a RF strength threshold.

4. A CR system according to claim 2 also comprises: a threshold adjuster for rising the RF strength threshold (THR_A->THR_B) and making one and a plurality of channels with smaller RSSI than the RF strength threshold (THR_B) without any WLAN event by operating the WLAN-event sensor again to provide selecting information for the second available-channel selector, wherein the threshold adjuster can be operated repeatedly for gradually rising the RF strength threshold to search APs in different radius region.

5. A CR system according to claim 1 also comprises: a Clear Channel Assessment (CCA) element; and a WLAN packet receiving element for an advanced Clear Channel Assessment (ACCA) device to detect the WLAN event and RSSI event happening.

6. A CR system according to claim 5, wherein the WLAN event is happened when the CCA element outputs negative result of non-clear channel and the WLAN packet receiving element receives WLAN packet.

7. A CR system according to claim 5, wherein the RSSI event is happened when the CCA element outputs negative result of non-clear channel and the WLAN packet receiving element receives no WLAN packet.

8. A CR system according to claim 5, wherein the CCA element outputs negative result of non-clear channel for equal or larger signal strength of the current channel than a RF strength threshold and outputs positive result of clear channel otherwise.

9. A CR system according to claim 5, wherein the CCA element outputs negative result of non-clear channel for equal or larger preamble signal strength of received WLAN packets of the current channel than a RF strength threshold and outputs positive result of clear channel otherwise.

10. A CR system according to claim 1, wherein the first available-channel selector selects one and a plurality of channels which their RSSI_AVG is equal to or smaller than a minimum vale (MIN_RSSI_AVG) to the available channel list.

11. A Cognitive Radio (CR) method for distinguishing channels without interference from other RF devices in Wireless Local Area Network (WLAN) comprises steps of:
   (a) grabbing a period of signal for a waiting time in the current channel;
   (b) distinguishing one and a plurality of durations as WLAN event happening;
   (c) distinguishing one and a plurality of durations as Received Signal Strength Indicator (RSSI) event happening;
   (d) computing an average value of RSSI (RSSI_AVG) in the current channel during the RSSI event happening;
   (e) counting a number of WLAN packets (WLAN_CNT) in the current channel during the WLAN event happening; and
   (f) selecting one and plurality of channels with small RSSI_AVG and WLAN_CNT=0 to an available channel list and sorting the one and plurality of rest channels out of the available channel list from low RSSI_AVG to high RSSI_AVG to a sorting list,
wherein the WLAN channels include channels in 2.4 GHz Industrial, Scientific and Medical band (ISM band) and Unlicensed National Information Infrastructure band (UNII band).

12. A CR method according to claim 11, wherein the waiting time is long enough (e.g. 1000 ms) to do correct analysis for RSSI_AVG and WLAN_CNT.

13. A CR method according to claim 11, wherein the WLAN event is happened when WLAN packets are detected and their preamble signal strength is equal to or larger than a RF strength threshold.

14. A CR method according to claim 11, wherein the RSSI event is happened when no WLAN packet is detected and signal strength of current channel is equal to or larger than a RF strength threshold.

15. A CR method according to claim 13 also comprises steps of: rising the RF strength threshold (THR_A->THR_B); following sequence of the sorting list to detect WLAN event and to select the current channel into the available channel list when no WLAN event is detected in the current channel (i.e. when RSSI of the current channel is smaller than the RF strength threshold (THR_B)); and deleting the one and a plurality of selected channels from the sorting list.

16. A CR method according to claim 15 also comprises steps of: rising the RF strength threshold (THR_B->THR_C); following sequence of the sorting list to detect WLAN event and to select the current channel into the available channel list when no WLAN event is detected in the current channel (i.e. when RSSI of the current channel is smaller than the RF strength threshold (THR_C)); and deleting the one and a plurality of selected channels from the sorting list.

17. A CR method according to claim 15 also comprises a step of storing one and a plurality of channels in the sorting list to the available channel list from small WLAN_CNT to large WLAN_CNT.

18. A CR method according to claim 11 also comprises a step of deleting one and a plurality of channels with serious interference of other RF devices.

19. A CR method according to claim 18, wherein the one and plurality of channels with serious interference of other RF devices have the maximum value of RSSI_AVG in all of channels and difference between maximum value and minimum value of RSSI_AVG in all of channels is larger than a value of DISABLE_RSSI_VAL.

20. A CR method according to claim 11 also comprises a step of checking there is no WLAN event missed for too short time interval between two RSSI events to make a wrong decision of WLAN_CNT.

21. A CR method according to claim 20, wherein the time interval between two RSSI events has to be larger than exemplary 300 µs to make sure there is a large enough interval for WLAN event measuring between multi RSSI events.

* * * * *